United States Patent [19]

Underwood

[11] Patent Number: 5,783,041

[45] Date of Patent: Jul. 21, 1998

[54] METHOD FOR IMPARTING STRENGTH TO PAPER

[75] Inventor: Richard T. Underwood, Columbus, Ga.

[73] Assignee: Callaway Corporation, Columbus, Ga.

[21] Appl. No.: 634,431

[22] Filed: Apr. 18, 1996

[51] Int. Cl.$^6$ ................................................ D21H 21/20
[52] U.S. Cl. ................... 162/164.1; 162/164.3; 162/164.6; 162/168.3; 162/183
[58] Field of Search .................. 162/164.3, 164.6, 162/164.1, 166, 167, 168.2, 168.3, 183

[56] References Cited

U.S. PATENT DOCUMENTS

| | | | |
|---|---|---|---|
| 3,509,021 | 4/1970 | Woodward | 162/167 |
| 5,350,796 | 9/1994 | Devore et al. | 162/164.3 |
| 5,427,652 | 6/1995 | Darlington et al. | 162/164.3 |

*Primary Examiner*—Peter Chin
*Attorney, Agent, or Firm*—Bruce Jacobs; Diderico Van Eyl

[57] ABSTRACT

A method for imparting dry strength to paper by adding to a pulp slurry during a paper-making process a mixed resin solution containing (i) an aminopolyamide-epichlorohydrin resin and (ii) a glyoxylated acrylamide-dimethyl diallyl ammonium chloride resin, in combination with (iii) a high charge density cationic polymer.

13 Claims, 2 Drawing Sheets

METHOD FOR IMPARTING STRENGTH TO PAPER

FIELD OF THE INVENTION

The present invention is directed to an improved method for imparting dry strength to paper, particularly recycled paper.

BACKGROUND OF THE INVENTION

Additives are typically used during paper-making processes to impart strength to paper. During the stock-preparation step of paper-making processes, for instance, paper-making pulps are most conveniently handled as aqueous slurries, so that they can be conveyed, measured, subjected to desired mechanical treatments, and mixed with nonfibrous additives before being delivered to a paper making machine. During filling and loading stages of paper-making processes, materials such as mineral pigments are added to the pulp slurries. During sizing, materials are added to slurries in order to render the resulting paper sheet more resistant to penetration of liquids. During continuous sheet forming steps of paper-making processes, additives are delivered to fiber slurries at the wet end of paper machines.

Glyoxylated polyacrylamide-diallyldimethyl ammonium chloride copolymer (GPA) resins are known for use as dry strength and temporary wet strength resins for paper. U.S. Pat. No. 4,605,702, for instance, teaches the preparation of a wet strength additive by glyoxalating an acrylamide copolymer having a molecular weight from about 500 to 6000. The resulting resins have limited stability in aqueous solution and gel after short storage periods even at non-elevated temperatures. Accordingly, the resins are typically supplied in the form of relatively dilute aqueous solutions containing only about 5–10 wt % resin.

Aminopolyamide-epichlorohydrin (APAE) resins have been used as wet strength additives for paper. U.S. Pat. No. 3,311,594, discloses the preparation of APAE wet strength resins. The resins are prepared by reacting epichlorohydrin with aminopolyamides, sometimes referred to as polyaminoamides, or polyaminourylenes containing secondary amino hydrogens. The APAE resins can also exhibit storage problems in concentrated form and gel during storage, although generally to a lesser extent than the GPA resins. As such, it has been common practice to dilute the APAE resins to low solids levels to minimize gelation. The APAE resins also impart dry strength to paper, but the vast increase in wet strength which results simultaneously has made APAE resins unsuitable for use as dry strength resins in the preparation of recyclable paper.

U.S. application Ser. No. 08/601,296, filed Feb. 16, 1996, discloses a method for improving the strength of recycled paper by adding a mixed resin solution of APAE resin and GPA resin to the wet end of the paper-making process. The use of the mixed APAE:GPA resin solution produces paper which exhibits significantly increased dry strength performance as compared to the joint use of the resins individually. This invention is an improvement thereover.

U.S. application Ser. No. 08/601,297, filed Feb. 16, 1996, claims the mixed resin solution of Ser. No. 08/601,297 which solution exhibits enhanced stability as compared to the individual resin solutions.

High charge density cationic resins have typically not been capable of imparting dry strength to paper. For example, dimethylamine-epichlorohydrin resins have been used as components of dual polymer retention aid and systems. These resins do not impart dry strength to paper in this application.

It has been discovered that the method disclosed in U.S. application Ser. No. 08/601,296, filed Feb. 16, 1996, can be further improved by the addition of a high charge density cationic (HCDC) resin along with the mixed resin solution.

It is an object of this invention to develop a method for imparting dry strength of paper.

It is a further object of this invention to develop a method for improving the dry strength of paper by means of a resin solution of APAE and GPA resin and a high charge density cationic resin.

SUMMARY OF THE INVENTION

The present invention is directed to a method for imparting dry strength to paper by adding to a pulp slurry during a paper-making process a mixed resin solution comprising (i) an aminopolyamide-epichlorohydrin resin, (ii) a glyoxylated acrylamide-diallyldimethyl ammonium chloride resin, and (iii) a high charge density cationic resin.

DESCRIPTION OF THE PREFERRED EMBODIMENTS

Figure 1:
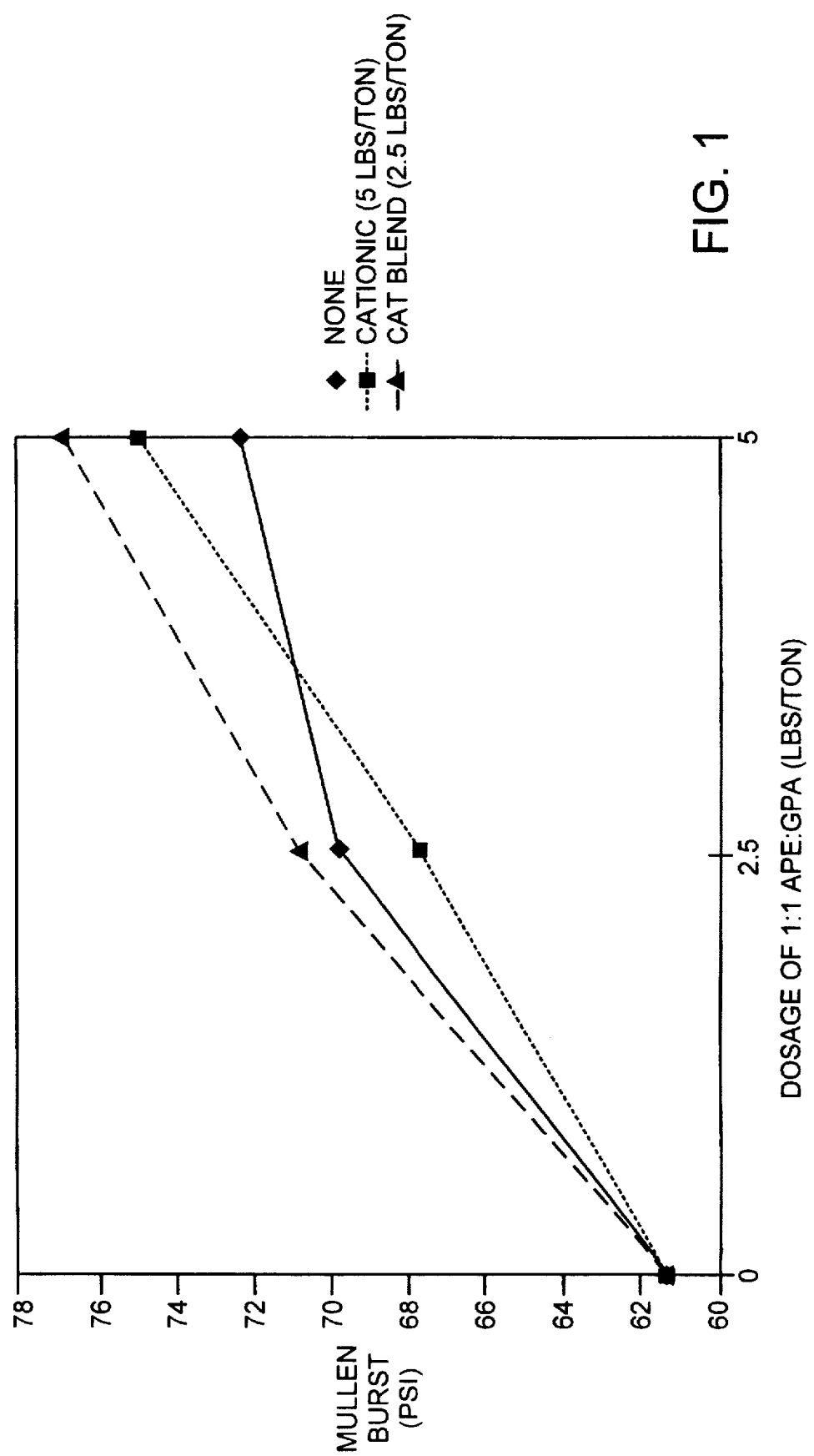
FIG. 1 is a graph showing the Mullen Burst strength of sheets produced from virgin linerboard pulp when linerboard was prepared with (i) a 1:1 GPA:APAE resin solution alone at a dosage rate of 2.5 and 5 lbs/ton, (ii) blends of a 1:1 GPA:APAE resin solution at these dosage rates and a high charge density cationic resin added at 2.5 lbs/ton, and (iii) a 1:1 GPA:APAE resin solution at a dosage rate of 2.5 and 5 lbs/ton along with separate addition of a high charge density cationic resin added at 5.0 lbs/ton.

The present invention is directed to a method for imparting dry strength to paper by adding to a pulp slurry during a paper-making process a mixed resin solution comprising (i) an aminopolyamide-epichlorohydrin resin and (ii) a glyoxylated acrylamide-diallyldimethyl ammonium chloride resin, and (iii) a high charge density cationic resin. The resin solution functions as an improved dry strength additive when added to the wet end of a paper machine used to prepare recycled paper, as compared to when a mixed resin solution of only APAE and GPA resins are used.

The APAE resin is prepared by reacting an aminopolyamide and epichlorohydrin in a conventional manner, such as is disclosed in U.S. Pat. Nos. 3,197,427, 3,442,754, and 3,311,594, the subject matter of each patent is incorporated herein by reference. APAE resin solutions have a viscosity of less than about 150 cp for at least 90 days when kept at room temperature as a solution containing about 12.5 wt % resin.

The aminopolyamide is formed by reacting a carboxylic acid with a polyalkylene polyamine under conditions which produce a water-soluble, long-chain polyamide containing the recurring groups:

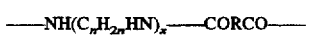

wherein n and x are each 2 or more and R is the divalent, organic radical of the dicarboxylic acid. Dicarboxylic acids useful in preparing the aminopolyamide include saturated aliphatic dicarboxylic acids, preferably containing from about 3 to 8 carbon atoms, such as malonic, succinic, glutaric, adipic, and so on, together with diglycolic acid. Of these, diglycolic acid and the saturated aliphatic dicarboxylic acids having from about 4 to 6 carbon atoms in the molecule, namely, succinic, glutaric, and adipic acids are the most preferred. Blends of two or more dicarboxylic acids may be used, as well as blends which include higher saturated aliphatic dicarboxylic acids such as azelaic and sebatic, as long as the resulting long-chain polyamide is water soluble or at least water dispersible.

Useful polyamines include polyalkylene polyamines such as polyethylene polyamines, polypropylene polyamines, polyoxybutylene polyamines. More specifically, the polyalkylene polyamines of this invention are polyamines containing two primary amine groups and at least one secondary amine group in which the nitrogen atoms are linked together by groups of the formula ——$C_nH_{2n}$—— where n is a small integer greater than about 1, and the number of such groups in the molecule ranges from up to about eight, preferably about four. The nitrogen atoms may be attached to adjacent carbon atoms in the ——$C_nH_{2n}$—— group or to carbon atoms further apart, but not to the same carbon atom. Specific polyamines include but are not limited to diethylenetriamine, triethylenetetramine, tetraethylenepentamine, dipropylenetriamine, and the like. Suitable polyamines for use in this invention also include mixtures and various crude polyamine materials, such as the polyamine mixture obtained by reacting ammonia and ethylene dichloride.

A preferred method for preparing the APAE resin entails reacting an aminopolyamide with epichlorohydrin in a mole ratio of epichlorohydrin to free amino groups of about 0.5:1.8, and more preferably 0.5:1.5 in aqueous solution, and more preferably 1:1.25. The temperature may vary from about 45° C. to about 100° C. Suitable APAE resins are commercially available and may be obtained from several sources including Callaway Chemical Company, Columbus, Ga. under the trade name Discostrength® 5800.

The GPA resin is prepared by first copolymerizing an acrylamide monomer with diallyldimethyl ammonium chloride (DADMAC) in aqueous solution, and then reacting the resulting copolymer with glyoxal, such as is disclosed in U.S. Pat. Nos. 3,556,932, and 4,605,702. Although not presently preferred, other comonomers may be used: methacryloyloxyethyl trimethyl ammonium methyl sulfate, methacryloyloxyethyl trimethyl ammonium chloride, acryloyloxyethyl trimethyl ammonium methyl sulfate, acryloyloxyethyl trimethyl ammonium chloride, acrylamidopropyl trimethyl ammonium chloride. The subject matter of each patent is incorporated herein by reference. A resin solution of GPA generally has a viscosity of less than about 150 cp and does not gel for at least 14 days when kept at room temperature as a solution containing 8 wt % resin.

Suitable acrylamide monomers for use herein may be any acrylamide, such as acrylamide per se, methacrylamide and the like. Moreover, up to about 10% by weight of the acrylamide comonomers may be replaced by other comonomers copolymerizable with the acrylamide, i.e. acrylic acid, acrylic esters such as ethyl acrylate, methylmethacrylate, acrylonitrile, styrene, vinylbenzene sulfonic acid, and the like. Generally, from about 75 to about 95 wt % acrylamide, and from about 5 to 25 wt % diallyldimethyl ammonium chloride are used.

In copolymerizing the acrylamide with the diallyldimethyl ammonium chloride, free radical generating initiators are generally added to an aqueous monomer solution. The polymerization takes place at a temperature that is generally between about room temperature and about 100° C. The resulting AM-DADMAC copolymer has an equivalent molecular weight that is generally in the range from about 500 to 100,000 daltons, preferably about 35,000 to about 50,000 daltons.

In reacting the resulting acrylamide-DADMAC copolymer and the glyoxal, the mole ratio of the glyoxal to the acrylamide copolymer is preferably between about 2:1 to about 0.5:1, and more preferably about 1:1. The temperatures employed are preferably from about 25° C. to about 100° C., and the pH during the reaction is preferably kept within the range of about 3 to about 10. Suitable GPA resins may be obtained from Callaway Chemical Company, Columbus, Ga. under the trade name Discostrength® 19.

The high charge density cationic resins used herein are water soluble cationic resins having a cationic charge density about 2.5 meq/g and higher, where the charge density is determined by charge titration using potassium polyvinyl sulfonate. Preferably the resin has a charge density of at least 3.0 meq/g. More preferably the resin has a charge density of about 4.0 to 7.5 meq/g. The high charge density cationic resin is not thermosetting and does not significantly increase the dry strength of paper when used alone. Preferably the resin is capable of maintaining its high cationic charge density over a wide pH range, i.e. from about 2 to above about 9. Suitable high charge density cationic resins include dimethylamine-epichlorohydrin resins, poly(dimethyldiallylammonium chloride (DMDAC) resins, polyethyleneimine resins and reaction products of APAE resins and amines such as dimethyl amine. The high charge density cationic resin is typically used as aqueous resin solution containing about 20 to 50 wt % cationic resin, preferably about 20 to 35 wt %. Suitable high charge density cationic resins are commercial polymers which are readily available from numerous sources, including the assignee of this application.

The high charge density cationic resin and the GPA and APAE may be added to a papermaking operation either independently or in a blend of all three resins, or the GPA and APAE may be mixed to form a mixed resin solution and the high charge density cationic resin added simultaneously therewith.

The GPA and APAE resins are generally used in a weight ratio of between about 1:1 and about 5:1. Preferably, the GPA:APAE weight ratio is between about 1:1 and 4:1 and more preferably it is between about 1.2:1 and about 2:1. The high charge density mixed resin is generally used in an amount of about 10 to 75 wt % of the total weight of the GPA and APAE.

In the present invention, the mixed resin solution is incorporated into a pulp slurry at a dosage rate that will impart the desired dry strength to the paper. Generally, the resin solution is applied at a dosage rate between about 1 lb/ton of pulp slurry to 20 lbs/ton. Preferably, the dosage rate is from about 3 to 15 lbs/ton, and more preferably the dosage rate is from about 5 to 10 lbs/ton. The actual dosage rate, however, may vary according to factors such as the resin concentration of the mixed resin solution, the temperature, and the equipment used.

The high charge density cationic resin is utilized in combination with the GPA and APAE in a suitable amount such that the resulting combination provides at least a 10% dry strength increase as compared to paper prepared with only the GPA and APAE. Preferably, the combination provides at least a 25% improvement. More preferably the combination provides at least a 40% improvement.

The resins can be effectively applied to preformed paper by the "tub" or impregnation method, but is more conveniently applied directly to the pulp slurry at any point in the paper-making process where dry or wet strength additives are customarily added. The resins are thus typically added to the pulp slurry prior to the wet end of a recycled paper machine before the slurry is introduced through a headbox and slice, and before the slurry proceeds down the screen and is dried into a paper sheet.

This invention imparts dry strength to paper, particularly recycled paper, as measured by one or more of the paper's dry tensile strength, Mullen Burst, ring crush, Z-directional tensile strength, and Concora. The plateau range (the range over which amounts of the resin solution are added to an aqueous suspension of cellulose paper-making fibers at a given pH produces a negligible variation in dry strength) has not been ascertained for all fibers, but can readily be found by routine experimentation.

A benefit of this invention is that it allows an increase in machine speed and output, as compared to using only APAE and GPA resins.

In the following non-limiting examples, all parts and percents are by weight unless otherwise specified.

EXAMPLE 1

To evaluate the present invention, handsheets were produced from a commercial virgin linerboard pulp having a pH of about 5.5. The pulp was treated with (i) an GPA:APAE resin solution and (ii) a high charge density cationic resin.

The GPA:APAE resin solution had a weight ratio of 1:1 and was prepared according to the following procedure. A GPA resin solution (Discostrength® 19 having 8.0 wt % resin solids) was obtained from Callaway Chemical Co. An APAE resin solution (Discostrength® 5800 having 12.5 wt % resin solids) was obtained from Callaway Chemical Co. The APAE resin solution was placed in a mixing vessel equipped with a motor-driven stirrer and thermometer and the GPA resin solution added thereto at the desired weight ratio. The mixture was stirred until a uniform resin solution was visually produced.

The high charge density cationic resin used was a solution of a condensation polymer of dimethylamine and epichlorohydrin resin, had a charge density of about 7.2 meq/g, 50 wt % resin solids, and was obtained from Callaway Chemical Co. under the trade name Callaway 4000.

The GPA:APAE resin solution was added to the wet end of the paper machine at rates of about 2.5 lbs/ton and 5.0 lbs/ton. The high charge density cationic resin solution was added along with the mixed resin solution at 5.0 lbs/ton. Blends of the GPA:APAE resin and the high charge density cationic resin were added such that the dosage of the GPA:APAE resin was 2.5 and 5.0 lbs/ton, and the dosage of the high charge density cationic resin was 2.5 lbs/ton. Handsheets were prepared at a basis weight of 30 lbs/1000 sq. ft on a Noble and Wood type handsheet mold. After drying on the drum dryer the sheets were conditioned in a 105° C. oven for one hour. The sheets were conditioned in a constant temperature/constant humidity room and then tested for Mullen Burst strength. The procedure was repeated with the exception that the high charge density cationic resin was not added.

FIG. 1 is a graph showing the Mullen Burst strength of sheets produced from virgin linerboard pulp increased when the handsheets were treated with the GPA:APAE resin solution and the high charge density cationic resin as compared to the sheets treated only with the GPA:APAE resin alone. As can be seen, the addition of the high charge density cationic resin when added in a blend with the GPA:APAE resin at 2.5 lbs/ton produced increased strength at both levels of the GPA:APAE mixed resin solution. When sheets were treated with the GPA:APAE mixed resin solution at 5 lbs/ton and the high charge density cationic resin at 5 lbs/ton, the handsheets exhibited a lower strength than when the GPA:APAE mixed resin solution was used at 5 lbs/ton and the high charge density cationic resin at 2.5 lbs/ton. When sheets were treated with the GPA:APAE mixed resin solution at 2.5 lbs/ton and the high charge density cationic resin at 5 lbs/ton, the handsheets exhibited a lower strength than when the GPA:APAE mixed resin solution was used at 2.5 lbs/ton and the high charge density cationic resin was not used. Each of these results suggests that too high a level of cationic charge can be detrimental.

EXAMPLE 2

The procedure of Example 1 was repeated on a commercial paper machine with the following exceptions. The slurry was 100% recycled furnish. The pH at the headbox was 7.0–7.5. The 1:1 APAE:GPA strength resin was added to the machine chest at a level of 4.7 lbs total dry resin per ton of dry pulp, and the high charge density cationic resin (dimethylamine-epichlorohydrin resin, charge density 7.2 meq/g) was added to the blend chest at a level of 1.6 lbs dry resin per dry ton of pulp. Table 1 shows the results of the trial.

TABLE 1

|  | Before addition of high charge density cationic resin | After addition of high charge density cationic resin |
| --- | --- | --- |
| Production (tons/hour) | 8.5 | 9.4 |
| Machine Speed (ft/min) | 300 | 330 |
| Ring Crush (Newtons) | 400 | 420–440 |
| Z-Directional Tensile | 78–80 | 90–95 |

Table 1 shows that the addition of the cationic resin imparted an increase of more than 10% in production, as compared to using only the GPA:APAE mixed resin solution. The addition of the cationic resin increased the machine speed by 10 % and increased the ring crush up to about 10%. The addition of the cationic resin increased the Z-directional tensile strength by more than 10%.

EXAMPLE 3

The procedure of Example 1 was repeated, with the following exceptions. The handsheets were prepared at a basis weight of 40 lbs/3000 sq.ft. The APAE:GPA resin was added a dosage rate of 5 lbs/ton. The cationic resin was added at 1.25 and 2.5 lbs/ton.

TABLE 2

| 1:1 APAE:GPA (lbs/ton) | Cationic Resin (lbs/ton) | Dry Tensile (lbs/in) | % Improvement |
| --- | --- | --- | --- |
| 0 | 0 | 17 | — |
| 5 | 0 | 19.5 | 15.1 |
| 5 | 1.25 | 20.5 | 21.1 |
| 5 | 2.5 | 21.2 | 24.8 |

EXAMPLE 4

The procedure of Example 3 was repeated except that the cationic resin was blended into the APAE:GPA resin solution prior to addition of the single three-component resin solution to the wet end of the paper machine.

TABLE 3

| 1:1 APAE:GPA (lbs/ton) | Cationic Resin (lbs/ton) | Dry Tensile (lbs/in) | % Improvement |
|---|---|---|---|
| 0 | 0 | 17 | — |
| 5 | 1.25 | 20.9 | 22.9 |
| 5 | 2.5 | 20.7 | 21.9 |

Table 3 shows that at dosages of 1.25 and 2.5 lbs/ton high charge density cationic resin with 5 lbs/ton 1:1 APAE:GPA substantially equivalent results were obtained.

EXAMPLE 5

The procedure of Example 3 was repeated except that the dimethylamine-epichlorohydrin cationic polymer was replaced by a different such polymer. The cationic polymer was poly(dimethyldiallyl ammonium chloride) (DMDAC) having a cationic charge density of 6.2 meg/g. This resin is commercially available from Callaway Chemical Company under the trade name Jayfloc 842. The test results are given in Table 4.

TABLE 4

| 1:1 APAE:GPA (lbs/ton) | Cationic Resin (lbs/ton) | Dry Tensile (lbs/in) | % Improvement |
|---|---|---|---|
| 0 | 0 | 17 | — |
| 5 | 0 | 19.5 | 15.1 |
| 5 | 1.25 | 21.7 | 27.6 |

Figure 2:
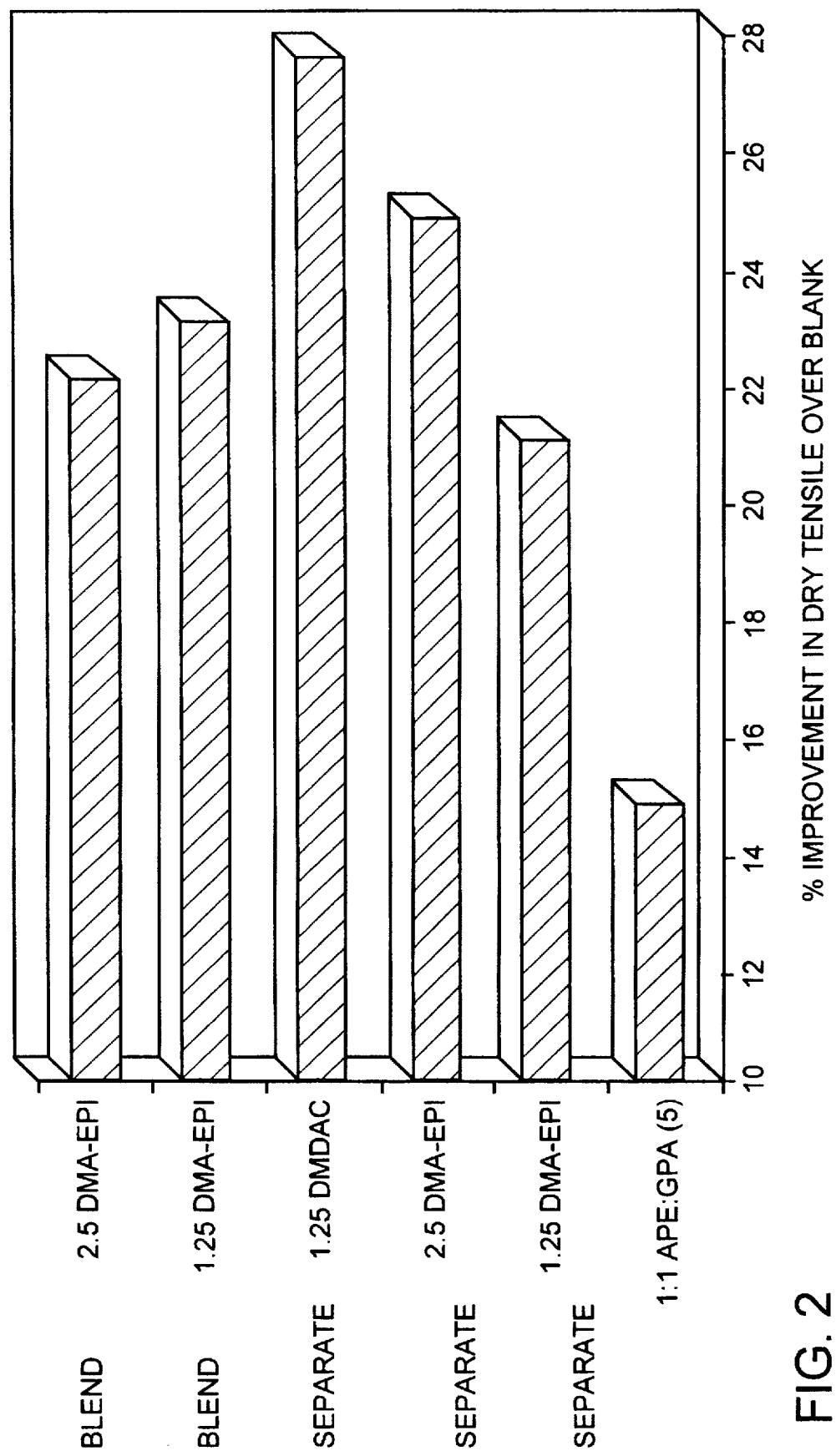
FIG. 2 shows the dry tensile results of Example 2 when various high charge density cationic resin solutions are added in combination with GPA and APAE resins.

FIG. 2 graphically shows the test results of Examples 3–5.

What is claimed is:

1. A method for imparting strength to paper comprising the step of adding to a pulp slurry during a paper-making process (1) a pre-mixed resin solution comprising (i) a thermosetting aminopolyamide-epichlorohydrin resin, and (ii) a glyoxylated acrylamide-diallyldimethyl ammonium chloride resin, respectively, and (2) a non-thermosetting high charge density cationic resin having a cationic charge density of at least about 2.5 meg/g; wherein the pre-mixture and the non-thermosetting high charge density cationic resin are added to the wet end of a paper machine in amounts that are sufficient to impart dry strength to paper produced by the paper machine, wherein the aminopolyamide-epichlorohydrin resin and the glyoxylated acrylamide-diallyldimethyl ammonium chloride resin are present at a weight ratio of about 1:1 to about 5:1, and the high charge density cationic polymer is present in an amount of about 20 to 100% of the total weight of the aminopolyamide-epichlorohydrin resin and the glyoxylated acrylamide-diallyldimethyl ammonium chloride resin.

2. The method of claim 1, wherein the strength imparted is dry strength.

3. The method of claim 1, wherein the high charge density cationic resin is selected from the group consisting of dimethylamine-epichlorohydrin resins, poly(dimethyldiallylammonium chloride) resins, polyethyleneimine resins, and reaction products of aminopolyamide-epichlorohydrin resins and amines.

4. The method of claim 1, wherein the glyoxylated acrylamide-diallyldimethyl ammonium chloride resin and the aminopolyamide-epichlorohydrin resin and are present at a weight ratio of about 1:1 to about 4:1.

5. The method of claim 1, wherein the glyoxylated acrylamide-diallyldimethyl ammonium chloride resin and the aminopolyamide-epichlorohydrin resin and are present at a weight ratio of about 1:1 to about 2:1.

6. The method of claim 1, wherein the high charge density cationic resin is added to the pulp slurry in the amount of about 1 to about 5 pounds per ton of the pulp slurry.

7. The method of claim 1, wherein the high charge density cationic resin is added in a suitable amount to provide at least a 40% dry strength increase in the paper, as compared to paper prepared with only the aminopolyamide-epichlorohydrin resin and the glyoxylated acrylamide-diallyldimethyl ammonium chloride resin.

8. The method of claim 5, wherein the high charge density cationic resin has a charge density of about 7.2 meq/g.

9. The method of claim 1, wherein the high charge density cationic resin comprises an aqueous resin solution containing about 20 to 50 wt % cationic resin.

10. The method of claim 1, wherein the high charge density mixed resin is used in an amount of about 10 to 75 wt % of the total weight of the glyoxylated acrylamide-diallyldimethyl ammonium chloride resin and the aminopolyamide-epichlorohydrin resin.

11. The method of claim 1, wherein the aminopolyamide-epichlorohydrin resin and the glyoxylated acrylamide-diallyldimethyl ammonium chloride resin, and the high charge density cationic resin are added to a papermaking operation independently.

12. The method of claim 1, wherein the aminopolyamide-epichlorohydrin resin, the glyoxylated acrylamide-diallyldimethyl ammonium chloride resin, and the high charge density cationic resin are added to a papermaking operation in a blend of all three resins.

13. The method of claim 1, wherein the aminopolyamide-epichlorohydrin resin and the glyoxylated acrylamide-diallyldimethyl ammonium chloride resin are mixed to form a mixed resin solution, and the high charge density cationic resin is added simultaneously to the mixed resin solution.

* * * * *